(12) United States Patent
Benoit et al.

(10) Patent No.: US 6,468,661 B2
(45) Date of Patent: *Oct. 22, 2002

(54) MULTILAYER STRUCTURE CONTAINING CAVITATED MATERIALS FOR USE IN THE PRODUCTION OF SECURITY DOCUMENTS

(75) Inventors: Gordon L. Benoit, Victor; Dennis E. McGee, Penfield, both of NY (US)

(73) Assignee: ExxonMobil Oil Corporation, Fairfax, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/729,807

(22) Filed: Dec. 5, 2000

(65) Prior Publication Data

US 2001/0000147 A1 Apr. 5, 2001

Related U.S. Application Data

(60) Continuation of application No. 09/325,446, filed on Jun. 3, 1999, now abandoned, which is a continuation-in-part of application No. 09/162,219, filed on Sep. 28, 1998, now Pat. No. 6,294,267, which is a continuation-in-part of application No. 08/872,988, filed on Jun. 11, 1997, now Pat. No. 5,935,696, application No. 09/729,807, which is a continuation-in-part of application No. 09/064,993, filed on Apr. 23, 1998, now Pat. No. 5,879,028, and a continuation-in-part of application No. 08/467,484, filed on Jun. 6, 1995, now Pat. No. 6,270,610, which is a division of application No. 08/266,918, filed on Jun. 27, 1994, now Pat. No. 5,698,333, application No. 09/729,807, which is a division of application No. 08/762,089, filed on Dec. 9, 1996, now Pat. No. 5,716,695, which is a division of application No. 08/601,886, filed on Feb. 15, 1996, now Pat. No. 5,618,630.

(51) Int. Cl.[7] .................. B32B 27/08; B32B 27/32; B32B 27/40; B32B 27/34; B42D 15/10

(52) U.S. Cl. .................. 428/424.2; 428/480; 428/500; 428/515; 428/516; 428/910; 428/916; 428/476.1; 283/57; 283/58; 283/59; 283/109

(58) Field of Search ................ 428/424.2, 500, 428/515, 516, 219, 323, 330, 910, 916, 327, 480, 476.1; 283/57–59, 109

(56) References Cited

U.S. PATENT DOCUMENTS

| | | | |
|---|---|---|---|
| 4,632,869 A | * 12/1986 | Park et al. | 428/315.5 |
| 5,422,175 A | 6/1995 | Ito et al. | 428/304.4 |
| 5,618,630 A | * 4/1997 | Benoit et al. | 428/500 |
| 5,698,333 A | * 12/1997 | Benoit et al. | 428/516 |
| 5,716,695 A | * 2/1998 | Benoit et al. | 428/195 |
| 5,871,833 A | 2/1999 | Henbo et al. | 428/138 |
| 5,879,028 A | * 3/1999 | Benoit | 283/72 |
| 5,935,696 A | * 8/1999 | Benoit et al. | 428/219 |
| 6,270,610 B1 | * 7/2001 | Benoit et al. | 156/220 |

FOREIGN PATENT DOCUMENTS

WO 00/18575 4/2000

* cited by examiner

Primary Examiner—Paul Thibodeau
Assistant Examiner—Ramsey Zacharia
(74) Attorney, Agent, or Firm—Rick F. James; Dennis P. Santini

(57) ABSTRACT

A laminated multilayer film substrate for use in the production of banknotes having an oriented polypropylene core layer and at least one high density polyethylene layer on each side of the oriented polypropylene layer. The core layer contains microcavities formed by the addition of a cavitating agent. The resultant films exhibit good embossability, deadfold characteristics and other properties, making them highly suited for the production of bank notes and other security documents.

15 Claims, No Drawings

MULTILAYER STRUCTURE CONTAINING CAVITATED MATERIALS FOR USE IN THE PRODUCTION OF SECURITY DOCUMENTS

RELATED APPLICATIONS

This application is a continuation of Ser. No. 09/325,446, filed Jun. 3, 1999, now abandoned, which is a continuation-in-part of U.S. application Ser. No. 09/162,219 now U.S. Pat. No. 6,294,267, filed Sep. 28, 1998 which is a continuation-in-part of U.S. application Ser. No. 08/872,988 now U.S. Pat. No. 5,935,696, filed Jun. 11, 1997; Ser. No. 09/064,993 now U.S. Pat. No. 5,879,028, filed Apr. 23, 1998; and Ser. No. 08/467,484 now U.S. Pat. No. 6,270,610, filed Jun. 6, 1995, which is a divisional of U.S. application Ser. No. 08/266,918, filed Jun. 27, 1994, now U.S. Pat. No. 5,698,333 and Ser. No. 08/762,089, filed Dec. 9, 1996, now U.S. Pat. No. 5,716,695, which is a divisional of U.S. application Ser. No. 08/601,886, filed Feb. 15, 1996, now U.S. Pat. No. 5,618,630, incorporated herein by reference.

FIELD OF THE INVENTION

The present invention relates to a multilayer film for use in the production of paper-like products such as bank notes, security documents, including travelers and bank checks, and to a method for their production. More particularly, the present invention relates to a multilayer film having the characteristics of the high quality papers typically employed in the production of bank notes and security documents.

BACKGROUND OF THE INVENTION

In the production of bank notes, security documents and the like, rag paper has been employed for over 300 years. As is well known, rag paper has several properties which are highly desirable in such applications, including dead foldability, tear resistance, printablilty and embossability.

These highly desired properties may be characterized as follows: deadfold is the ability of a substrate to be creased or folded and to retain the fold without opening. Tear resistance is the ability of a substrate to resist both initiated and uninitiated tears and punctures. Printability is the ability of the substrate to adsorb and bond inks used during the lithographic printing process. Embossability is the ability of the substrate to deform under the pressures of the intaglio printing process to form a raised image on the resulting bank note or security document, with the intaglio ink remaining on the raised, deformed region resulting in a high degree of tactility or feel to the bank note or security document. As may be appreciated, these properties combine to give bank notes and the like their familiar feel and functionality.

With the advent of color copiers and computer graphic scanners, the counterfeiting of bank notes has markedly increased. While there are active programs underway by major currency paper producers to make their substrate more secure through the use of watermarks, metallized threads and optical variable devices (OVD's), such as photochromics, holographics, and diffraction gratings, at this time, these efforts do not appear to hold much promise of thwarting counterfeiters.

Security features can be incorporated into or onto the bank note, including reverse printing of the note to protect the security devices and the print.

Australian Patent No. 488,652, discloses an approach to the production of security articles, particularly bank notes, and describes the serious problems which confront conventional bank notes with respect to forgery. The bank note disclosed therein comprises a substrate of opaque thermoplastic sheet material intimately bonded to a web of woven or unwoven thermoplastic fibers, the substrate being printed as desired and having bonded thereon one or more optically-variable security devices. The fibrous web was employed to impart durability, crumple-resistance and tear-strength to the note. Where a security device, such as a Moire pattern, was employed which depended for its optically variable properties upon the transmission of light, it was necessary to punch out a hole in the substrate, insert the device and bond it in place with further layers of transparent plastic sheet material.

Although samples of bank notes formed according to the disclosure of Australian Patent No. 488,652 were said to have performed most satisfactorily with respect to the durability and security of conventional notes, they were found to be rather complex in construction and relatively expensive to produce. Moreover, when transmission security devices were laminated between layers in the substrate, an area of weakness and high stress was created which reduced both durability and security.

Other disclosures relating to anti-counterfeiting techniques include U.S. Pat. Nos. 4,095,217 and 4,281,208, which relate to the use of a liquid crystal device driven by a photovoltaic element, such as a solar cell or an amorphous silicon material.

U.S. Pat. No. 4,472,627 relates to currency or other valuable documents containing a liquid crystal/photovoltaic device which produces a coded display in response to artificial or ambient light. The device can function both as an anti-counterfeiting deterrent and also as a means for permitting a user to easily authenticate the validity of a document containing such a device.

U.S. Pat. No. 4,536,016 discloses a security token, such as a bank note or identity card, which comprised a sheet-like substrate made up from film of transparent biaxially oriented polymer coated with layers of opaque and heat activated adhesive material. The opaque layer is applied in such a way as to leave a transparent area for inspection of a security device, for example, a diffraction grating, incorporated in the polymer film. The substrate could bear printed or other identifying indicia and was protected with an intimately bonded layer of transparent polymeric material.

The substrate employed in U.S. Pat. No. 4,536,016 was based on the use of oriented polypropylene (OPP). After several commemorative bank note printings, while meeting many of the requirements for a bank note substrate, the plastic bank notes were found to fail in three major areas. First, the OPP substrate did not dead fold, causing problems in that the film retains either a flat or curved form, jamming cash registers and automatic handling equipment. Second, the OPP substrate has poor initiated tear resistance in the processing of currency, which quite frequently creates nicks on the edges of bills, resulting in catastrophic tears. Finally, the OPP product did not exhibit the tactility of paper currency, due to the fact that OPP does not emboss well during the intaglio process.

Oriented high density polyethylene films have been employed in the area of plastic packaging. Such films, biaxially oriented to a degree of greater than 6.5 times in both the machine direction (MD) and the transverse direction (TD) are described in British Patent 1,287,527. U.S. Pat. No. 4,680,207 relates to imbalanced biaxially oriented films of linear low density polyethylene oriented up to six times in the machine direction, and up to three times in the transverse direction but less than in the machine direction.

U.S. Pat. No. 5,618,630 relates to a three-ply mulitlayer film structure for the production of banknotse.

While the aforementioned films have been shown to offer certain advantages over the prior art and generally meet the requirements for which they were designed, a need still exists for a film which provides the characteristics of a high quality, rag-type paper of the type typically employed in the production of bank notes and security products.

Therefore, it is an object of the present invention to provide a multilayer film having the characteristics of a high quality rag paper.

It is another object of the present invention to provide such a multilayer film which possesses the dead-fold characteristics of high quality papers while being easy to manufacture and reasonably durable.

It is a further object of the present invention to provide a multilayer film which possesses a high degree of tear resistance to both initiated and uninitiated tears and punctures in at least one direction.

It is yet another object of the present invention to provide a multilayer film which possesses the printability and embossability of a high quality paper.

It is still a further object of the present invention to provide a multilayer film which possesses a high degree of resistance to curling at higher temperatures, e.g., above 150° F.

Still another object of the invention is to provide a multilayer film which is suitable for banknote production from which it is difficult to abrade inks resulting in banknotes of long service life. Such films can achieve high levels of durability without overlaying the inked surface with protective coatings such as lacquers or polyurethanes.

Other objects and the several advantages of the present invention will become apparent to those skilled in the art upon a reading of the specification and the claims appended thereto.

SUMMARY OF THE INVENTION

The multilayer film of the present invention is an opaque three-ply structure. In a preferred embodiment, at least one layer of oriented polypropylene (OPP) is surrounded by at least one layer of high density polyethylene (HDPE) on either side of the OPP layer.

The multilayer film of the present invention exhibits good performance in repetitive fold tests. The multilayer film structure of the present invention also has high tensile strength in both the oriented and unoriented direction.

In accordance with the present invention, there is provided a curl-resistant, cross-sectionally symmetrical, laminated multilayer film substrate for use in the production of banknotes, security papers and the like comprising:

(a) an imbalanced biaxially oriented first layer having inner and outer sides, comprising at least about 50 weight percent of a high density polyethylene having a density of at least about 0.94, said first layer being oriented in at least a first direction to a degree which is at least three times less than the degree of orientation present in a second direction substantially normal to the first direction;

(b) a balanced biaxially oriented second layer having inner and outer sides, comprising a cavitating agent and at least about 90 wt. % polypropylene, said second layer being oriented in at least a first direction, at an orientation ratio of at least 4:1, and oriented in a second direction substantially normal to said first direction, at an orientation ratio of at least 6:1;

(c) an imbalanced biaxially oriented third layer having inner and outer sides, comprising at least about 50 weight percent of a high density polyethylene having a density of at least about 0.94, said third layer being oriented in at least a first direction to a degree which is at least three times less than the degree of orientation present in a second direction substantially normal to the first direction; and (d) a laminating adhesive resin disposed between the inner sides of (a) and (c), said second layer being laminated to said first and third layers so that the first direction of orientation of said third layer is substantially aligned with the first direction of orientation of said first layer and wherein (a) further comprises a coextruded propylene copolymer skin on its inner side.

DETAILED DESCRIPTION OF THE INVENTION

In forming the multilayer film of the present invention at least one layer of the substrate comprises oriented polypropylene and a cavitating agent. The use of oriented polypropylene in the core results in high tensile properties and high performance in repetitive fold tests. The use of a cavitating agent in the core offers good opacity which minimizes the need for a heavy opacifying coating.

It is preferred to use oriented polypropylene (OPP) in the core. However, other biaxially oriented polymers of a comparable tensile strength, such as linear low density polyethylene (LLDPE), nylons or polyester may also be used. It is preferred that the OPP core be free of any additives, for example, anti-static agents and silicone, which have an impact on adhesion to other layers.

The core layer of the present invention comprises a plurality of voids formed by cavitation about a solid cavitation agent, such as polybutylene terephthalate and/or calcium carbonate. Polybutylene terephthalate, e.g., 0.2 to 2 microns in diameter, as described in U.S. Pat. Nos. 5,288,548; 5,264,277; and 4,632,869, the contents of which are incorporated herein by reference, is a suitable cavitation agent. The spherical particles form microvoids on orientation, resulting in a white opaque product.

The use of a cavitating agent in the core layer offers good opacity, which reduces the need for a heavy opacifying coating and thus reduces the weight of the banknote. The reduced weight improves set off when freshly printed banknotes are stacked in sheets at the end of the press. The notes at the bottom of the stack will be exposed to less pressure from the reduced stack weight.

In forming the multilayer film substrates for use in the production of the bank notes and other security documents of the present invention, at least two layers of the substrate are to contain a major proportion of a high density polyethylene (HDPE) having a density of at least about 0.94, preferably at least about 0.945. These film layers may be composed exclusively of a single HDPE resin, a mixture of HDPE resins, or of HDPE containing a minor proportion of another polymeric material, such as low density polyethylene (LDPE), linear low density polyethylene (LLDPE), polypropylene, ethylene vinyl alcohol (EVOH) copolymer, ethylene propylene (EP) copolymer, ethylene propylene butene-1 (EPB) copolymer, polyetser or nylon, although a single HDPE resin or a blend of HDPE resins is particularly preferred in the practice of the present invention. Films made with either a blend of HDPE resins or with microcrystalline wax have been found to reduce the splittiness of the film which manifests itself as the tendency of the film to break in the TD direction.

When blends of HDPE polymers are employed, such blends can comprise two or more polymers all of which preferably have densities of 0.94 or greater. Blends of HDPE polymers advantageously comprise a major proportion of HDPE having a melt index of 0.6 to 1.2 and one or more polymers having a different melt index.

Terblends may also be desirable. Suitable terblends generally comprise 50 to 98 weight percent, preferably 84 to 96 weight percent of HDPE having a density of 0.96 or higher and a melt index of greater than 0.5 to about 2.0; 1 to 25 weight percent, preferably 3 to 8 weight percent of HDPE having a density of 0.94 or greater and a melt index of 0.1 to 0.5; and 1 to 25 weight percent, preferably 3 to 8 weight percent, of HDPE having a density of 0.96 or higher and a melt index of greater than 2 to about 8. Preferably, the second and third HDPE polymers which are minor components are present in about equal amounts.

As is particularly preferred, the film substrate of the present invention includes a) a first layer comprising at least about 50 weight percent of a high density polyethylene having a density of at least about 0.94, the first layer oriented in at least a first direction, e.g., machine direction (MD), to a degree which is at least three times less than the degree of orientation present in a second direction substantially normal to the first direction, e.g., transverse direction (TD); (b) a second layer comprising at least about 90 weight percent polypropylene, the second layer being oriented in at least a first direction e.g., machine direction (MD), at an orientaion ratio of at least 3:1, and oriented in a second direction substantially normal to said first direction e.g., transverse direction (TD), at an orientation ratio of at least 6:1; and c) a third layer also comprising at least about 50 weight percent of a high density polyethylene having a density of at least about 0.95, the third layer also oriented in at least a first direction, e.g., MD, to a degree which is at least three times less than the degree of orientation present in a second direction, e.g., TD, substantially normal to the first direction, the third layer being laminated to the film substrate so that the first direction of orientation of the third layer is substantially parallel to (or aligned with) the first direction of orientation of the first layer.

A method of producing HDPE films with imbalanced biaxial orientation is disclosed in U.S. Pat. No. 4,870,122, the contents of which are incorporated by reference in their entirety.

As may be appreciated, to achieve the object of improved tear resistance in a multilayer film of the type describe herein, it has been discovered that imbalanced biaxially oriented HDPE films, laminated so that their primary directions of orientation are aligned substantially parallel to each other, can exhibit increased tear resistance where an orientable laminating resin, e.g., polyurethane, is disposed between the layers and subjected to orienting so that the primary direction of orientation in the oriented resin is substantially normal to the primary direction of orientation of the first and third HDPE film layers. In one embodiment, such orientation in the primary direction of orientation of the laminating adhesive resin is achieved during the laminating step itself, preferably in the machine direction (MD).

The degree of orientation of the HDPE film layers is an important aspect of this invention inasmuch as the proper degree of orientation provides desirable physical properties. Although higher density HDPE resin having a density of 0.957 or greater can be made directly into thin films by cast extrusion, problems of curling, uniformity and flatness exist. Accordingly, thin HDPE films of about 0.8 to 1.5 mils having the best balance of properties are obtained using imbalanced biaxially oriented films prepared from films having a cast gauge of 4 to 15 mils which are reduced to the desired gauge by stretching, i.e., orientation.

The films are produced and oriented in a conventional manner. The film is heated to its orientation temperature and first subjected to MD orientation between two sets of nip rolls, the second rotating at a greater speed than the first in an amount equal to the desired draw ratio. Then the film is TD oriented by heating and subjecting it to transverse stretching in a tenter frame. Typically MD orientation is conducted at 60 to 120° C. and TD orientation at 110 to 145° C.

While it is preferred that the degree of orientation in a first film direction be at least three times less than the degree of orientation present in a direction substantially normal to the first direction, it is more particularly preferred that each HDPE film layer be oriented to an extent of about 1.1 to about 2.0 times in the machine direction (MD) and about 6 to about 12 times in the transverse direction (TD). It has been found that the HDPE film layers can be produced with excellent quality at caster speeds of up to about 110 feet per minute (fpm) corresponding to line speeds of 140 fpm at 1.25 times MD orientation. In the alternative, the degree of orientation in a first film direction can be at least three times greater than the degree of orientation present in a direction substantially normal to the first direction. Even unoriented blown HDPE may be used as the first and third layers and still maintain some degree of deadfold in the multilayer film substrate of the present invention.

When employed, this degree of imbalanced orientation produces an interesting effect in the HDPE components of the structure. The effect is a visible rippled and striated appearance, with the ripples being parallel to the transverse orientation direction. Under low magnification, in each square centimeter of HDPE film there will be seen from about 5 to about 30 discontinuous undulating ripples and striations generally parallel to the direction of orientation. This effect gives the film a slight translucent appearance, which tends to slightly blur distant objects viewed through the film. This effect indicates that the layers have been oriented in an imbalanced manner. The high density polyethylenes contemplated for use in the practice of the present invention include those disclosed in U.S. Pat. No. 4,870,122.

In the oriented polypropylene layer the orientation is adjusted to give essentially balanced tensile properties in both directions.

To achieve the desired surface characteristics required of the paper-like products of the present invention, one or more skin layers can be applied, in any known manner, to the multilayer HDPE substrate material, for example by coating or coextrusion before orientation or by coating the HDPE after one or both of the orientation operations. The skin layer can be any of the conventional materials used for this purpose in conjunction with polyolefin films, particularly polyethylene films. For example, to achieve a press-ready surface, a polymeric resin could be blended with fillers, fibers, pigments or the like, as necessary. Additionally, voided films, such as those disclosed in U.S. Pat. Nos. 4,377,616, 4,632,869, 4,758,462 and others, may be laminated to the multilayer HDPE substrate to impart the opacifying properties of those structures to the films of the present invention.

The HDPE-containing layers (a) and (c) as disclosed above can further comprise copolymer polypropylene skins, e.g., ethylene-propylene-butene-1 terpolymer, provided on at least one side thereof, preferably on both the inner and outer sides thereof. In one embodiment, the skins themselves can also comprise a component which is similar to components in the adhesive resin used to laminate layers (a), (b) and (c). For example, low density polyethylene (LDPE) can make up from 10 to 20 wt % of the skins, with the balance being a copolymer polypropylene.

A suitable adhesion-promoting primer which provides greater adhesion between the laminated surfaces, e.g., polymers selected from the group consisting of polyethyleneimide, epoxy, polyurethane, and acrylic, can be provided between the copolymer polypropylene skins (on the inner sides of (a) and (c)) and the laminating adhesive resin. Primer compositions are disclosed in U.S. Pat. Nos. 4,447,494 and 4,681,803, which are incorporated herein by reference.

It is also envisioned that the coated substrate can be embossed, dyed, printed, texturized or otherwise treated before or after lamination; this being done on the internal or external surfaces of the laminated layers, so as to provide, for example, visual and/or tactile identification of the nature of a banknote, its significance or value. Printing processes include, but are not limited to, lithography, UV-screen, flexography, gravure and intaglio printing processes. Any flexo or gravure printable ink, either colors or machine readable ink, such as lithographic, IR, UV, magnetic and intaglio inks, can be used. Printing on the core is also a security feature as well.

The opaque cavitated three-ply structure of the present invention can be surface-printed without losing opacity. This is a surprising result for intaglio processes which employ relatively high temperatures (greater than 70° C.) and high pressures (greater than 1000 psi). Unlaminated cavitated films would generally have their cavitation crushed and lose opacity under similar conditions. The cavitation acts as a cushion that diminishes the abrasion force seen by the ink, making the ink more abrasion resistant.

The laminating techniques which can be employed to effect the present invention are known in the art and include: adhesive-bonding or cementing, e.g., with laminating adhesive resins, preferably with a transparent agent; solvent-bonding, where a mist of solvent is sprayed over the surfaces to be bonded together; thermal lamination by heat-bonding where thermoplastic sheets are subject to a hot rolling or pressing operation; cast-lamination where one layer is cast onto the second and the second forms a substrate; or, extrusion or draw-lamination as in calendering operations known in the art.

The use of solventless or 100% solids adhesive resins, such as a two-part polyurethane resin, WD4110, available from H.B. Fuller Co., is particularly preferred. 100% solids laminating adhesives are an effective alternative to solvent-based adhesives. 100% solids laminating adhesives impart excellent clarity, enhancement of printing, high bond strength and heat sealing resistance to the multilayer film laminated structure of the present invention.

When discrete security devices are incorporated within the substrate, e.g., optically-variable devices (OVD's), they can be enclosed in pouches affixed to the substrate. On the other hand, the optically-variable devices themselves may be incorporated in one (or both) layers of the laminated substrate or between the layers, it not being necessary to incorporate a physically discrete device within a clearly defined pouch formed between the layers.

Any suitable security device can be employed in the present invention such as one selected from the group consisting of optically variable devices (OVDs), magnetic devices, electronic devices, and rare earth element-containing devices, with OVDs particularly preferred.

As employed in the present specification, the term "optically variable" is used to denote any device which can readily be made to change appearance in a reversible, predictable and reproducible manner. The appearance of such devices may be altered, for example, by the application of body-heat or manual pressure, the variation of the angle of viewing and, the lighting conditions under which viewing takes place. The type of devices envisioned by the present invention are: diffraction gratings, liquid crystals, moire patterns and similar patterns produced by cross-gratings with or without superimposed, refractive, lenticular and transparent grids, such as Fresnel lenses, spaced partially-reflective, and partially transparent, coatings yielding variable interference patterns or the like, bi-refringent or polarizing layers, zone-plates and the like.

Generally, optically-active devices of this nature are readily recognized by unskilled persons and are yet extremely difficult to reproduce by photographic and printing techniques. Moreover the production of any one such device in a reproducible fashion and the incorporation of such a device in a plastic laminate as described by the present invention is likely to be beyond the resources of the great majority of would-be forgers. Where a flexible paper-like product such as a banknote is sought, it is of course preferable that the optically-variable devices should, themselves, be sheet-like, flexible and thin; it is also preferable for such devices to be compatible with the plastic material employed for the laminae to facilitate bonding and mitigate against reactive changes occurring with time.

According to the present invention, one preferred form of optically variable device may be a reflecting diffraction grating consisting of a metallized thermoplastic film embossed with a diffraction pattern. To prevent access to the embossed pattern for the purpose of illicit replication, it is preferable according to the present invention to employ a layer of thermoplastic material on each side of the metallized film which has similar solubility characteristics to that of the metal layer so that separation by preferential etching will be rendered extremely difficult. Another preferred device is a moire pattern formed by photographically reproducing fine line or dot patterns on each side of a thin film. The spacings of the dots and lines can be readily made too fine to be reproduced by printing techniques and yet the moire pattern can be displayed upon a much larger scale. Unique diffraction and moire patterns will often be preferred for use in bank notes and techniques are available for producing those by computer and photo-reduction methods.

Security features can be incorporated into or onto the bank note, including reverse printing of the note to protect the security devices and the print.

It has been found that films similar to those of the present invention but which are "cross-oriented," can be susceptible to curling at temperatures above 150° F. Such cross-oriented films are similar to those of the present invention except that the second layer is laminated to the film substrate so that the first (primary) direction of orientation of the second layer is substantially normal to the first (primary) direction of orientation of the first layer. It is believed that such curling can result from differences in shrinkage at high temperatures in the machine direction and transverse direction of each layer. Additional curling susceptibility can result where coatings or skins of the layers have different coefficients of contraction from the HDPE component of the layers. Such imbalanced contraction and its attendant curling can be avoided by counterbalancing the overall shrinkage properties of one layer by laminating thereto a second layer identical to the first layer which is provided as a mirror image of the first layer. In other words, one half of the layered film structure is a mirror image of the other, with the plane of symmetry being along the horizontal midline of the layered film structure cross-section. This provides a cross-sectionally symmetrical layered film structure. Examples of such films include those of ABA, ABBA, ABCCBA, ABCDCBA, etc. construction where each letter represents a film layer, skin, coating, or adhesive layer. Such a cross-sectionally symmetrical layered film structure is necessarily a "parallel-oriented" structure, i.e., the primary direction of orientation of the first layer is parallel to the primary direction of orientation of the second layer in order to meet the mirror image requirement. Such a construction provides a symmetrical structure wherein the opposing shrinkage forces counteract each other to a significant degree. However, such a two layer parallel construction can be susceptible to poor tear properties in one direction, e.g, TD where two TD oriented films are employed.

It has now been found that using a low density polyethylene (LDPE) and/or a linear low density polyethylene (LLDPE) laminating resin oriented in the primary direction of orientation which is substantially perpendicular to the primary direction of orientation of the layers which it ties, evinces reduced susceptibility to tearing. The laminating resin can itself be subjected to orienting to some extent during lamination, preferably after the resin has at least partially or completely solidified, and preferably in the machine direction. Such orienting can be from 1.5 to 10 times, preferably from 4 to 6 times, corresponding to a total drawdown of the laminating adhesive resin of greater than 10%, preferably greater than 20%, say, 75%.

It has also been found that by using a 100% solids resin as the laminating adhesive resin employed, orientation effects resulting from the lamination procedure are improved, resulting in a multilayer film exhibiting curt resistance and improved chemical resistance.

One or both of the HDPE containing layers may be weakened in terms of tear resistance in one direction to a point where they are significantly weaker than the laminating adhesive resin and the OPP containing core layer. When attempting to delaminate the structure for counterfeiting purposes, only small strips of the outer printed HDPE containing layers would be removed. The entire HDPE containing layers would not be removable.

The HDPE containing layer can be tear weakened using process conditions during manufacture. Microperforating with laser technology and/or nicking will also cause the HDPE containing layers to weaken. The microperforations are either diagonal or unidirectional, e.g. in the range of from about 50 to about 300 dots per inch (dpi).

The HDPE layers can also be tear weakened through the addition of incompatible additives that would cause the layer to fibrilate or fracture during orientation. Suitable incompatible polymer additives which effect crystallization include polyester (PET), polybutylene terephthalate (PBT), polystyrene or a mixture thereof. Generally, from about 1 to about 10 wt. %, preferably from about 4 to about 8 wt. % of incompatible additive is added to the HDPE layer(s). Fibrillation results in regions of oriented HDPE surrounding long, planar regions of the incompatible polymer resulting in low tear regions.

The OPP core layer is not weakened and essentially provides the tensile properties and tear resistance of the structure as a whole.

The invention is further illustrated by the following non-limiting examples.

EXAMPLE 1

This example demonstrates the preparation of a multilayer film substrate produced in accordance with the present invention which is suitable for preparing banknotes having good dead fold characteristics.

A multilayer oriented film substrate having a 1.15 mil final thickness is prepared by coextruding HDPE with copolymer polypropylene skins on both sides to form a first layer (a). The HDPE employed is Oxychem M-6211, available from Occidental Chemical Corp., Dallas, Tex., having a density of 0.96 and a melt index of 1.0. The copolymer polypropylene skins comprise 90 wt. % Chisso 7510, an ethylene-propylene-butene-1 terpolymer, available from Chisso Corp. of Japan, and 10 wt. % Nobil LKA-753, a low density polyethylene available from Mobil Chemical Co., Norwalk, Conn. HDPE comprises about 90 wt. % of the resulting film layer (a) while the skins comprise 10 wt. % (5 wt. % on each side). The film (a) is then oriented 1.4 times in the MD at about 115° C. and 6 to 12 times, e.g. 10 times in the TD at about 115–140° C. in a tenter frame.

Layer (a) is 100% solids adhesively laminated to an OPP layer containing polybutylene teraphthalate (1.20 mil OPPa-lyte™420 HTW) using a two-part polyurethane resin, WD4110, available from H. B. Fuller Co.

The two-ply layer is again 100% solids adhesively laminated with Fuller WD4110 to another HDPE layer described above.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims.

It is claimed:

1. A curl-resistant, cross-sectionally symmetrical, laminated multilayer film substrate for use in the production of banknotes and security papers comprising:

(a) an imbalanced biaxially oriented first layer having inner and outer sides, comprising at least 50 weight percent of a high density polyethylene having a density of at least 0.94, said first layer being oriented in at least a first direction to a degree which is at least three times less than the degree of orientation present in a second direction substantially normal to the first direction;

(b) a balanced biaxially oriented second layer having inner and outer sides, comprising a cavitating agent and at least 90 wt. % polypropylene, said second layer being oriented in at least a first direction at an orientation ratio of at least 4:1 and oriented in a second direction substantially normal to said first direction at an orientation ratio of at least 6:1;

(c) an imbalanced biaxially oriented third layer having inner and outer sides, comprising at least 50 weight percent of a high density polyethylene having a density of at least 0.94, said third layer being oriented in at least a first direction to a degree which is at least three times less than the degree of orientation present in a second direction substantially normal to the first direction; and (d) a laminating adhesive resin disposed between the inner sides of (a) and (c), said second layer being laminated to said first and third layers so that the first direction of orientation of said third layer is substantially aligned with the first direction of orientation of said first layer and wherein (a) further comprises a coextruded propylene copolymer skin on its inner side.

2. The film substrate of claim 1 wherein both (a) and (c) further comprise a copolymer polypropylene skin on at least one side thereof.

3. The film substrate of claim 1 wherein both (a) and (c) further comprise copolymer polypropylene skins on both the inner and outer sides thereof.

4. The film substrate of claim 1 wherein (d) comprises a solventless adhesive.

5. The film substrate of claim 4 wherein (d) comprises polyurethane.

6. The film substrate of claim 1 wherein (d) comprises a component selected from the group consisting of low density polyethylene (LDPE) and linear low density polyethylene (LLDPE).

7. The film substrate of claim 1 further comprising (e) a security device between (a) and (c).

8. The film substrate of claim 7 wherein said security device is selected from the group consisting of optically variable devices (OVDs), magnetic devices, electronic devices, and rare earth element-containing devices.

9. The film substrate of claim 1 further comprising (e) a security device printed on layer (b) prior to laminating with laminating adhesive resin (d).

10. The film substrate of claim 3 wherein said copolymer polypropylene skins on said outer sides are externally coated with an opacifying coating.

11. The film substrate of claim 1 in the form of a bank note.

12. The film substrate of claim 1 wherein said first direction is machine direction (MD) and said second direction is transverse direction (TD).

13. The film substrate of claim 1 wherein said first and/or third layers comprise polyester, polyolefins and/or nylon.

14. The film substrate of claim 1 wherein said cavitating agent is selected from the group consisting of polybutylene terephthalate and calcium carbonate.

15. The film substrate of claim 14 wherein said cavitating agent is polybutylene terephthalate.

* * * * *